United States Patent Office 2,851,477
Patented Sept. 9, 1958

2,851,477
METHOD FOR PREPARING ARYLSUCCINO-NITRILES

Ralph B. Davis, Notre Dame, Ind., assignor to University of Notre Dame Du Lac, Notre Dame, Ind., a corporation of Indiana No Drawing. Application April 5, 1957
Serial No. 650,840

11 Claims. (Cl. 260—465)

This invention relates to a new method for preparing arylsuccinonitriles which comprises reacting an aldehyde, an aryl methylene cyanide and an alkali metal cyanide.

As aldehydes there are employed unsubstituted aromatic aldehydes, aliphatic aldehydes and alkyl, alkoxy and halo substituted aromatic aldehydes.

As aryl methylene cyanides there are used unsubstituted aryl methylene cyanides and alkyl, alkoxy and halo substituted aryl methylene cyanides in which the substituents are attached to the aryl group, and also compounds capable of yielding aryl methylene cyanides under the reaction conditions such as aryl methylene halides.

As alkali metal cyanides there is ordinarily employed sodium cyanide. But other alkali metal cyanides can likewise be used.

The specific arylsuccinonitrile produced depends upon the specific aldehyde and the specific aryl methylene cyanide employed in the reaction. For example, benzaldehyde with benzyl cyanide and sodium cyanide yield $\alpha,\beta$-diphenylsuccinonitrile.

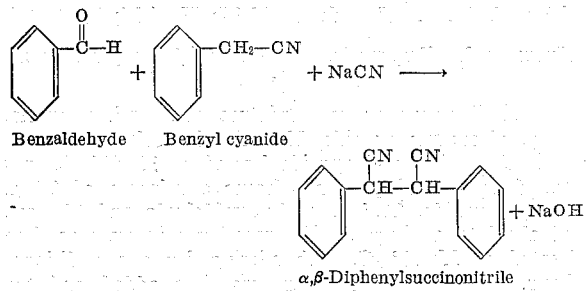

Prior to this invention, the preferred method for preparing $\alpha,\beta$-diphenylsuccinonitrile was the method as described by Lapworth and McRae, J. Chem. Soc., 121, 1709 (1922) in which benzaldehyde and benzyl cyanide were condensed to $\alpha$-phenylcinnamonitrile using a base as catalyst. Then hydrogen cyanide was added to the $\alpha$-phenylcinnamonitrile to produce $\alpha,\beta$-diphenylsuccinonitrile. In 1926, German Patent 427,416 was issued to I. G. Farben, which concerned the method of preparing $\alpha,\beta$-diphenylsuccinonitrile from the addition of hydrogen cyanide to $\alpha$-phenylcinnamonitrile using an alkali metal cyanide such as potassium cyanide. Of historical and theoretical interest are the methods employed by Chalanay and Knoevenagel as described in Berichte, 25, 292–4 (1892). These authors prepared $\alpha,\beta$-diphenylsuccinonitrile from the reaction of benzyl cyanide, benzal chloride and potassium cyanide and also from the reaction of benzyl cyanide, mandelonitrile and potassium cyanide.

The method as described in this invention is different from any of the methods previously used; and hence is novel. It yields unexpected products in that one skilled in the art might predict benzoins as the chief products of such reactions, since it is a well known fact that aromatic aldehydes form benzoins readily under the influence of alkali metal cyanides. Likewise this method is practical in so far as it is an improvement over previous known methods, it is easier, less time consuming, and less costly. Finally, many new arylsuccinonitriles have been produced by this method.

The arylsuccinonitriles are useful as intermediates in the preparation of the corresponding acids and the normal derivatives of the acids. For instance, $\alpha,\beta$-diphenylsuccinonitrile is hydrolyzed with sulfuric acid and water to $\alpha,\beta$-diphenylsuccinic acid as described by Lapworth and McRae in the reference previously cited. The "Dictionary of Organic Compounds," vol. II, pp. 429–30 (1953) by Heilbron and Burnbury lists a host of compounds that can be prepared from $\alpha,\beta$-diphenylsuccinonitrile. From this same compound can be prepared bis[2-(4-morpholinyl)ethyl]-$\alpha,\beta$-diphenylsuccinate, a useful local anesthetic and anti-spasmotic of low toxicity as described in U. S. Patent 2,475,852 (1949).

The arylsuccinonitriles can likewise be used as intermediates in the preparation of polyesters, dyes, medicinals and agricultural chemicals.

The components are reacted ordinarily at atmospheric pressure and ordinarily in the presence of a compatible diluting agent such as methanol and combinations of methanol and water. By a compatible diluting agent is meant one in which all the reactants are appreciably soluble without appreciably destroying any of the reactants under ordinary conditions. The production of one mole of an arylsuccinonitrile by this method requires at least one mole of aldehyde, one mole of aryl methylene cyanide and one mole of an alkali metal cyanide such as sodium cyanide. However, there is ordinarily used between about 50 and about 200 mole percent excess of an alkali metal cyanide such as sodium cyanide and between about 5 and about 30 mole percent excess of the aryl methylene cyanide. In place of the aryl methylene cyanide, a compound capable of yielding an aryl methylene cyanide under the reaction conditions can be used, such as an aryl methylene halide, for instance, benzyl chloride. In such cases where the aryl methylene cyanide is produced "in situ," a corresponding excess of the alkali metal cyanide is used. Ordinarily, all the alkali metal cyanide is placed in the diluting agent or agents, the mixture is brought to the reaction temperature which is ordinarily between about 30° C. and about 80° C. from about one-third to about one-half of the aryl methylene cyanide is ordinarily added, then the aldehyde and the rest of the aryl methylene cyanide, sometimes with additional diluting agent or agents, are gradually added to the stirred reaction mixture.

The following examples serve to illustrate this invention without, however, limiting the same thereto.

Example 1.—Preparation of $\alpha,\beta$-diphenylsuccinonitrile

In a one-liter, 3-neck, round-bottom flask fitted with a stirrer, a condenser and a dropping funnel was placed 100 ml. of distilled water and 61.2 g. (1.25 mole) of sodium cyanide. The stirrer was started and the flask was warmed until nearly all the cyanide dissolved. Absolute, acetone-free methanol (400 ml.) was added and the mixture heated to reflux, and 50 g. (0.425 mole) of benzyl cyanide was added all at once. A solution of 53 g. (0.5 mole) of benzaldehyde and 30 g. (.256 mole) of benzyl cyanide was then added dropwise over 30 minutes with stirring at reflux. After the addition was completed, the reaction mixture was stirred at reflux for an additional 30 minutes. During the course of the reaction, a colorless solid precipitated and the liquid gradually took on a dark blue-green color. The reaction mixture was then allowed to cool (2.5 hours), was filtered with suction, and the solid was washed well with 75% methanol-water, with water, again with 75% methanol-water and then with ether. The colorless solid material weighed 89.5 g. (77% yield), M. P. 204–5°. A sample recrystallized from glacial acetic acid with practically quantitative recovery, as described by McRae and Bannard, Org. Syn., 32, 63 (1952), melted at 238–9°.

*Example 2.—Preparation of α,β-diphenylsuccinonitrile*

Following the same method as described in Example 1, with the exception that 81 g. (1.25 mole) of potassium cyanide was used in place of the sodium cyanide, there was obtained 85.5 g. (74% yield) of product, M. P. 204–5°.

*Example 3.—Preparation of α,β-diphenylsuccinonitrile*

In a one-liter, 3-neck, round-bottom flask fitted with a stirrer, condenser and dropping funnel was placed 100 ml. distilled water, 61.2 g. (1.25 mole) of NaCN, 5 g. (0.089 mole) of potassium hydroxide, the stirrer started, and the flask warmed until all solid had dissolved. Absolute, acetone-free methanol was added (400 ml.), the mixture heated to boiling and 50 g. (0.425 mole) of benzyl cyanide introduced all at once. This was followed by a mixture of 53 g. (0.5 mole) of benzaldehyde, 30 g. (0.256 mole) of benzyl cyanide and 30 g. (0.5 mole) of glacial acetic acid; the first 10 ml. were added over 20 minutes, precipitation then began and addition of the remaining aldehyde mixture was completed in an additional 90 minutes. The mixture was refluxed for 15 minutes after addition and then cooled in an ice bath with stirring. After cooling to 10°, filtration and washing of the solid with 250 ml. 80% methanol, 300 ml. of $H_2O$ at 60°, and another 250 ml. 80% methanol, drying under vacuum gave 101 g. (87%) of a white solid, M. P. 202–5° recrystallized from acetic acid, M. P. 235–7° C.

*Example 4.—Preparation of α-[p-methoxyphenyl]-β-phenylsuccinonitrile*

To a mixture of 10 ml. of water, 12.2 g. (0.25 mole) of NaCN, 80 ml. of absolute methanol and 10 g. (0.086 mole) of benzyl cyanide heated to 47° was added with stirring over 15 minutes a mixture of 13.6 g. (0.1 mole) of anisaldehyde, 6 g. (0.051 mole) of benzyl cyanide, 80 ml. of absolute methanol and 10 ml. of water. The reaction mixture was then heated to reflux for 45 minutes with stirring, and was then cooled and filtered. The solid was washed with 80% methanol, water, again with 80% methanol, with ether, and then air dried. The white solid, 17.9 g. (68.5%) melted at 181–2°; recrystallized from acetic acid, M. P. 203–5° (Lit. val., M. P. 204°—see C. A. 29:1078).

*Example 5.—Preparation of α-[p-chlorophenyl]-β-phenylsuccinonitrile*

In like manner, to a mixture of 10 ml. $H_2O$, 12.2 g. (0.25 mole) NaCN, 80 ml. of absolute methanol and 10 g. (0.086 mole) of benzyl cyanide was added over 15 minutes with stirring at room temperature, a mixture of 14.1 g. (0.1 mole) of p-chlorobenzaldehyde, 6 g. (0.051 mole) of benzyl cyanide, 80 ml. of absolute methanol and 10 ml. of water. The temperature of the reaction mixture was gradually raised to 55° over 40 minutes and maintained at this temperature for 50 minutes with stirring. The reaction mixture was then cooled and filtered, and the solid washed in the usual manner. The yellowish solid, 16 g. (60% yield) melted at 193–5°, recrystallized from acetic acid, M. P. 226–7.5°, after a second recrystallization, M. P. 228°–9° C.

Analysis.—Calculated for: $C_{16}H_{11}N_2Cl$: C, 72.04; H, 4.16. Found: C, 72.22; H, 4.15.

*Example 6.—Preparation of α-[p-chlorophenyl]-β-phenylsuccinonitrile*

To a mixture of 10 ml. $H_2O$, 12.2 g. (0.25 mole) NaCN, 80 ml. absolute methanol and 12.9 (0.085 mole) of p-chlorobenzyl cyanide heated to 45–50° C. with stirring was added over 15 minutes a mixture of 10.6 g. (0.1 mole) of benzaldehyde, 7.75 g. (0.051 mole) of p-chlorobenzyl cyanide, 10 ml. of water and 80 ml. absolute methanol. The reaction mixture was slowly heated to 55° C. over 30 minutes. Heating was then discontinued and the mixture allowed to cool slowly to room temperature. The reaction mixture was filtered, the solid washed and air dried in the usual manner, yielding 21.5 g. of a light yellow solid (80.5% yield), M. P. 203° C.

*Example 7.—Preparation of α,β-di-[p-chlorophenyl]-succinonitrile*

To a mixture of 10 ml. of water, 12.2 g. (0.25 mole) of sodium cyanide, 80 ml. of absolute methanol and 12.9 g. (0.085 mole) of p-chlorobenzyl cyanide heated to 45° C. was added with stirring over 15 minutes a mixture of 14.1 g. (0.10 mole) of p-chlorobenzaldehyde, 7.75 g. (0.051 mole) of p-chlorobenzyl cyanide, 80 ml. of absolute methanol and 10 ml. of water. The reaction mixture was then heated to 50–55° C. for 30 minutes. The reaction mixture was then cooled and filtered, and the solid washed in the usual manner. The solid, 19.5 g. (65% yield), melted at 196–9° C., recrystallized twice from acetic acid, M. P. 234–6° C.

Analysis.—Calculated for: $C_{16}H_{10}Cl_2N_2$: C, 63.80; H, 3.35. Found: C, 63.96; H, 3.16.

*Example 8.—Preparation of α - [p-isopropylphenyl] - β-phenylsuccinonitrile*

In like manner to a mixture of 50 ml. of water, 30 g. of sodium cyanide, 200 ml. of absolute methanol and 20 g. of benzyl cyanide heated to reflux was added at reflux with stirring over 45 minutes a mixture of 29.6 g. of p-isopropylbenzaldehyde, 10 g. of benzyl cyanide and 50 ml. of absolute methanol. After heating at reflux with stirring for an additional hour, the reaction mixture was cooled and filtered. The solid, 32 g. (58% yield) was washed in the usual manner, M. P. 197–200° C., recrystallized from acetic acid, M. P. 204–6° C.

Analysis.—Calculated for: $C_{19}H_{18}N_2$: C, 83.18; H, 6.61; N, 10.21. Found: C, 83.37; H, 6.56; N, 10.25.

*Example 9.—Preparation of α-phenyl-β-propylsuccinonitrile*

In similar manner, to a mixture of 50 ml. of water, 49 g. of sodium cyanide, 250 ml. of absolute methanol and 15 g. of benzyl cyanide heated to 35–40° C. was added with stirring over 4 hours a mixture of 24 g. benzyl cyanide, 21.6 g. of butyraldehyde and 200 ml. of absolute methanol. The reaction mixture was then heated at 35–40° C. with stirring for one additional hour. Two liters of water was then added and the mixture extracted four times with 300 ml. portions of ether. The combined extracts were washed with water and then dried over potassium carbonate. The ether was removed by distillation, 200 ml. of fresh ether was then added, and the mixture was placed in the refrigerator over-night, during which time solid precipitated. The mixture was filtered and the solid washed with 70% methanol. The solid, 18 g. (30% yield) melted at 88–94° C. recrystallized from ethanol, M. P. 94–97° C.

Analysis.—Calculated for: $C_{13}H_{14}N_2$: C, 78.75; H, 7.12; N, 14.13. Found: C, 78.98; H, 7.16; N, 14.20.

*Example 10.—Preparation of α-[p-methoxyphenyl]-β-[p-chlorophenyl]-succinonitrile*

To a mixture of 10 ml. $H_2O$, 12.2 g. (0.25 mole) NaCN, 80 ml. absolute methanol and 12.9 g. (0.085 mole) of p-chlorobenzyl cyanide heated to 50–55° C. with stirring was added over 15 minutes a mixture of 13.6 g. (0.10 mole) of anisaldehyde, 7.75 g. (0.51 mole) of p-chlorobenzyl cyanide, 80 ml. absolute methanol and 10 ml. of water. The reaction mixture was then heated to reflux for 1¾ hours, 35 ml. of 80% methanol being added to assist stirring. The reaction mixture was cooled, filtered and the solid washed and dried in the usual manner. The colorless solid weighed 15.8 g.

(54% yield), M. P. 186–187.5° C., recrystallized from acetic acid, M. P. 222–223.5° C.

*Analysis.*—Calculated for: $C_{17}H_{13}N_2ClO$: C, 68.80; H, 4.41. Found: C, 68.58; H, 4.48.

*Example 11.—Preparation of α-[3,4-methylenedioxyphenyl]-β-phenylsuccinonitrile*

To a mixture of 10 ml. $H_2O$, 18.3 g. (0.374 mole) of NaCN, 80 ml. absolute methanol and 10 g. (0.086 mole) of benzyl cyanide heated to reflux with stirring was added all at once 15 g. (0.1 mole) of piperonal, 6 g. (0.051 mole) of benzyl cyanide, 80 ml. absolute methanol and 10 ml. of water. The reaction mixture was heated at reflux for 1½ hours with stirring. After the first half hour the walls of the flask were scratched, and crystals began to precipitate. After refluxing, the mixture was cooled, filtered, the solid washed and dried in the usual way. The colorless solid, 18 g. (65% yield) melted at 185–8° C., recrystallized from acetic acid, M. P. 218–219.5° C.

*Analysis.*—Calculated for: $C_{17}H_{12}N_2O_2$: C, 73.90; H, 4.38. Found: C, 74.31; H, 4.45.

*Example 12.—Preparation of α,β-diphenylsuccinonitrile*

In a one-liter, 3-neck, round-bottom flask fitted with a stirrer, condenser and a dropping funnel was placed 111 g. NaCN, 100 ml. of water and 500 ml. of absolute methanol. The mixture was heated to gentle reflux. Then 40 g. of benzyl chloride was added dropwise over 15 minutes with vigorous stirring. (See note.) Then a mixture of 90 g. of benzyl chloride and 53 g. of benzaldehyde was added over 35 minutes at gentle reflux with vigorous stirring. (See note.) The reaction mixture was then refluxed for one hour with vigorous stirring. The reaction mixture was then allowed to cool and was filtered. The solid was washed well with 70% methanol, water, 70% methanol and ether and then air dried. The solid weighed 93 g. (80% yield), M. P. 203–206° C., recrystallized from acetic acid, M. P. 235–236° C.

NOTE: The reaction is exothermic-caution. During the course of the reaction the heating mantle was removed most of the time, the reaction heat maintained reflux. After addition was complete, heat was applied.

*Example 13.—Preparation of α-[p-methoxyphenyl]-β-phenylsuccinonitrile*

In like manner, 80 g. NaCN, 80 ml. $H_2O$ and 400 ml. absolute methanol was heated to gentle reflux. Then 30 g. of benzyl chloride was added over 15 minutes with vigorous stirring. Then a mixture of 41 g. of anisaldehyde and 48 g. of benzyl chloride was added over 30 minutes with vigorous stirring at gentle reflux. Vigorous stirring and gentle reflux was then maintained for 1¼ hours. The reaction mixture was allowed to cool, the solid was filtered, washed and dried in the usual manner. The product, 51 g., melted at 182–184° C., recrystallized from acetic acid, M. P. 200–202° C.

*Example 14.—Preparation of α-[p-chlorophenyl]-β-phenylsuccinonitrile*

In like manner, 450 ml. of absolute methanol, 50 ml. of water and 60 g. NaCN was heated to gentle reflux. Then 40 g. of p-chlorobenzyl chloride (practical grade) was added at gentle reflux with vigorous stirring over 15 minutes. Then 26.5 g. of benzaldehyde in 50 ml. absolute methanol and 40 g. of p-chlorobenzyl chloride were added simultaneously but separately over a period of ½ hour at gentle reflux with vigorous stirring. Reflux and stirring were then maintained for one hour. The reaction mixture was allowed to cool, the solid filtered, washed and dried in the usual manner. The solid weighed 28 g., M. P. 194–196° C., recrystallized from acetic acid, M. P. 223–224° C.

Of course, many changes and variations in the reaction conditions, the reaction components, the diluting agents, the reaction temperature and duration, the methods of working up, isolating purifying and even further reacting the products, and the like may be made by those skilled in the art. For instance, during the course of such a reaction as described in Example 1, alkali metal hydroxide is gradually produced. During the early stages of the reaction, the base produced may actually be beneficial, but as its concentration increases it may become detrimental. By introducing a few grams, about 5 grams, of potassium hydroxide to the reaction mixture at the start, and then by introducing about one-half mole of acetic acid mixed with the one-half mole of benzaldehyde and the remaining benzyl cyanide, the product can be obtained in improved yield as described in Example 3.

Other aldehydes than those mentioned in the specification and in the examples can also be used, such as 2-naphthaldehyde, 2-thiophenealdehyde, 4-phenylbenzaldehyde, valeraldehyde, caproaldehyde, veratraldehyde, m-chlorobenzaldehyde, o-chlorobenzaldehyde, m-tolualdehyde, p-tolualdehyde, and others.

Other aryl methylene cyanides than those mentioned in the specification and in the examples can also be employed, such as 2-naphthyl methylene cyanide, 4-phenylbenzyl cyanide, 3-methoxybenzyl cyanide, 4-methoxybenzyl cyanide, 4-ethoxybenzyl cyanide, 3-methylbenzyl cyanide, 4-methylbenzyl cyanide, 3-ethylbenzyl cyanide, 3-chlorobenzyl cyanide, 2-chlorobenzyl cyanide, and others.

Likewise, many other arylsuccinonitriles than those mentioned in the specification and in the examples can be prepared by this method. As was previously stated, the specific arylsuccinonitrile produced depends upon the specific aldehyde and the specific aryl methylene cyanide used with the alkali metal cyanide, such that α[2-chlorophenyl]-β-phenylsuccinonitrile can be prepared from 2-chlorobenzaldehyde, benzyl cyanide and sodium cyanide; α-[4-methylphenyl]-β-phenylsuccinonitrile can be prepared from 4-methylbenzaldehyde, benzyl cyanide and sodium cyanide; α-phenyl-β-[3-chlorophenyl]-succinonitrile can be prepared from benzaldehyde; 3-chlorobenzyl cyanide and sodium cyanide; and other in like manner.

I claim:

1. The method of producing arylsuccinonitriles which comprises reacting an aldehyde of the class consisting of unsubstituted aromatic aldehydes, unsubstituted aliphatic aldehydes and lower alkyl, lower alkoxy and chlorine substituted aromatic aldehydes, an aryl methylene compound of the class consisting of unsubstituted aryl methylene cyanides, lower alkyl, lower alkoxy and chlorine substituted aryl methylene cyanides in which the substituents are attached to the aryl group and the corresponding aryl methylene chlorides, and an alkali metal cyanide in the presence of a compatible diluent.

2. The method of producing arylsuccinonitriles which comprises reacting an aldehyde of the class consisting of unsubstituted aromatic aldehydes, unsubstituted aliphatic aldehydes and lower alkyl, lower alkoxy and chlorine substituted aromatic aldehydes, an aryl methylene compound of the class consisting of unsubstituted aryl methylene cyanides, lower alkyl, lower alkoxy and chlorine substituted aryl methylene cyanides in which the substituents are attached to the aryl group and the corresponding aryl methylene chlorides, and an alkali metal cyanide at a temperature from about 30° C. to about 80° C. in the presence of a compatible diluent.

3. The method of producing arylsuccinonitriles according to claim 2, wherein the alkali metal cyanide is sodium cyanide.

4. The method of producing arylsuccinonitriles according to claim 2, wherein the aldehyde is benzaldehyde.

5. The method of producing arylsuccinonitriles according to claim 2, wherein the aryl methylene compound is benzyl cyanide.

6. The method of producing arylsuccinonitriles according to claim 2, wherein the aryl methylene compound is benzyl chloride.

7. The method of producing α,β-diphenylsuccinonitrile which comprises heating benzaldehyde, benzyl cyanide and sodium cyanide in the presence of a compatible diluent.

8. The method of producing α-[p-methoxyphenyl]-β-phenylsuccinonitrile which comprises heating p-methoxybenzaldehyde, benzyl cyanide and sodium cyanide in the presence of a compatible diluent.

9. The method of producing α-[p-chlorophenyl]-β-phenylsuccinonitrile which comprises heating p-chlorobenzaldehyde, benzyl cyanide and sodium cyanide in the presence of a compatible diluent.

10. The method of producing α-[p-isopropylphenyl]-β-phenylsuccinonitrile which comprises heating p-isopropylbenzaldehyde, benzyl cyanide and sodium cyanide in the presence of a compatible diluent.

11. The method of producing α,β-diphenylsuccinonitrile which comprises heating benzaldehyde, benzyl chloride and sodium cyanide in the presence of a compatible diluent.

References Cited in the file of this patent

FOREIGN PATENTS 427,416   Germany _____ Apr. 8, 1926

OTHER REFERENCES

Lapworth et al.: J. Chem. Soc. (London), vol. 121, 1709–10 (1922).